April 8, 1930.  A. HLAVAC  1,753,341
BRAIDER BOBBIN
Filed April 24, 1929
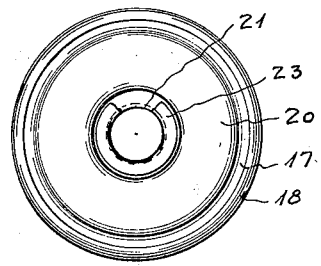
Fig. 2.
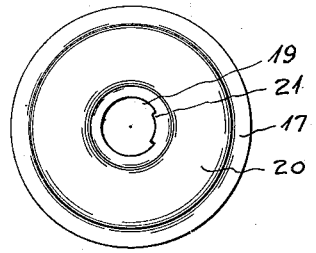
Fig. 5.
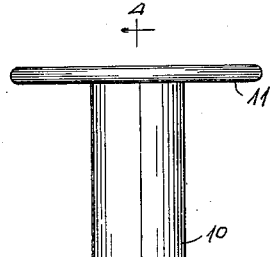
Fig. 1.
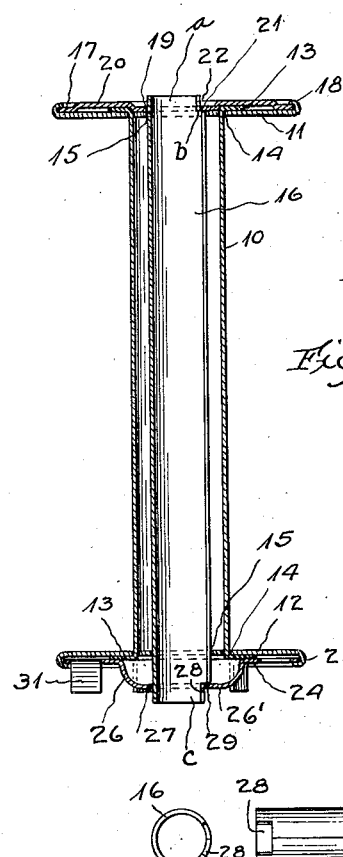
Fig. 4.
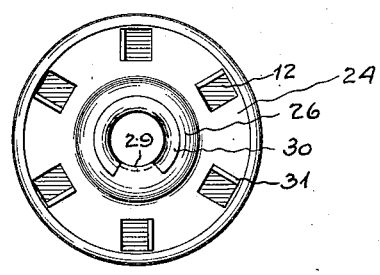
Fig. 3.
Fig. 7.  Fig. 6.
Inventor,
Anthony Hlavac
By Charles J. Schmidt.
Atty.

Patented Apr. 8, 1930

1,753,341

UNITED STATES PATENT OFFICE

ANTHONY HLAVAC, OF CHICAGO, ILLINOIS, ASSIGNOR TO EBER J. HUBBARD, OF BERWYN, ILLINOIS

BRAIDER BOBBIN

Application filed April 24, 1929. Serial No. 357,757.

My invention relates to braider bobbins constructed entirely of sheet metal and the important object is to provide improved construction of the ends and improved means for securing the ends to the core against rotational and longitudinal give and displacement.

The various features of my invention are incorporated in the structure shown on the drawing in which:

Fig. 1 is a side elevation,
Fig. 2 is a top view,
Fig. 3 is a bottom view,
Fig. 4 is a section on plane 4—4, Fig. 1,
Fig. 5 is a plan view of a reinforcing disk,
Fig. 6 is a side elevation of the lower part of the spindle tube, and
Fig. 7 is an end view of the spindle tube.

The bobbin comprises a cylindrical hub 10 of sheet metal, and upper and lower end disks 11 and 12. The hub has teeth 13 at its ends which extend through slots 14 in the end disks and are deflected radially outwardly against the outer faces of the disks. The disks have axial openings 15 for receiving the cylindrical core 16 formed from a rectangular piece of sheet metal, the core being concentric with the hub.

A reinforcing plate 17 is applied against the outer face of the upper end disk 11 and the end disk is deflected a distance around the periphery of the plate to form a rim 18 for securely clamping the plate against and concentric with the disk. The plate has the axial opening 19 registering with the upper end disk opening 15 and receiving the upper end of the core 16. Intermediate its inner and outer edges the plate has the annular outward deflection 20 which arches over and bears against the deflected teeth 13 of the hub to secure them in such locking position.

The plate 20 has the locking spline or tooth 21 which is quite wide in order to give the necessary strength. The adjacent end of the core has the slot or notch 22 of the same width as the tooth so as to intimately receive the tooth, and the radial depth of the tooth is preferably equal to the thickness of the core metal so that the end face of the tooth will be flush with the inner face of the core. After insertion of the core through the openings 15 and 19 its projecting end $a$ (Fig. 4) is deflected radially outwardly against the plate 20 to form the clamping flange 23 (Fig. 2) the plate 20 being then securely clamped between the flange 23 and the edge $b$ at the bottom of the slot 22, such clamping locking the core and plate against relative axial displacement and the tooth 21 locking them against relative rotational displacement. The outer faces of the flange 23, the deflection 20, and the rim 18 are preferably in a common plane.

A reinforcing plate 24 is applied against the outer face of the lower end disk 12, and the disk is rimmed around the plate periphery, as indicated at 25, to securely clamp the plate to and concentric with the end disk. The plate has the outward deflection or bay 26 which is of considerable depth and concentric with the end disk, and the outer wall 26' of the bay has the opening 27 of the same diameter as and in axial alinement with the opening 15 in the end disk 12. The plate at the base of the bay engages against the deflected teeth 13 of the hub and holds them securely in such position.

The lower end of the core 16 extends through the openings 15 and 27 and has the notch or slot 28 in its end for receiving the wide tooth or spline 29 projecting into the opening 27 from the wall 26'. After insertion of the core its projecting end $c$ (Fig. 4) is deflected radially outwardly and against the outer side of the wall 26' to form the locking flange 30 between which and the edge $d$ at the inner end of the slot 28 the wall 26' will be clamped. Such clamping locks the plate 24 and core against relative axial displacement and the tooth and notch lock them against relative rotational displacement. The core serves also as a tie for drawing and locking the end structures to the hub. Like the tooth 21, the tooth 29 terminates flush with the inner face of the core, thus leaving the core bore unobstructed for smooth engagement with spindles.

The plate 24 has sections deflected therefrom to form ratchet teeth 31 whose end faces are preferably in the plane of the outer face of the flange 30 so that the flange and teeth form a substantial seating or bearing surface for the bobbin.

The end wall 12 and the clamped plate 24 with its deep bay produces a light yet very strong base structure for the bobbin, the bay giving a truss effect. The support of the core by the wall 15 at considerable distance above the core joint with the bay wall 26' greatly strengthens the connection of the core with the base structure and makes the entire bobbin very resistant to distortion or bend out of axial alinement.

I do not desire to be limited to the exact structure shown as modification may be possible within the scope of the invention.

I claim:

1. A braider bobbin comprising a hub, end disks secured thereto, a reinforcing plate applied against the outer face of each disk, said disks and plates having registering axial openings, a core extending through said openings, and a wide tooth extending from each plate into its opening, said core at its ends having slots receiving said teeth and the core ends being deflected radially outwardly against the outer faces of said plates.

2. A braider bobbin comprising a hub, end disks interlocked with the hub ends, a reinforcing plate on the outside of each end disk having peripheral interlock therewith, said end disks and plates having axial openings, a tubular metal core fitting snugly in said openings and having a slot in each end, and a wide tooth on each reinforcing plate engaging in the respective core slot, the core ends being deflected radially outwardly against the outer faces of said plates.

3. In a bobbin, a base structure comprising a flat disk having an axial opening, a reinforcing plate applied against said disk and interlocked peripherally therewith, the middle section of said plate being deflected to be spaced away from said disk and having an axial opening, a tooth on said deflected section extending into its opening, and a metal tube seated in said axial openings and having a slot in its end receiving said tooth, the tube end being deflected radially outwardly against the outer face of said deflected section.

4. In a bobbin, a base structure comprising a disk having an axial opening, a reinforcing plate interlocked at its periphery with the disk periphery, said plate opposite said disk opening being deflected to be spaced a considerable distance away from said disk and having an axial opening in alinement with the disk opening, and a tube seated at its end in said openings and being interlocked with said plate.

5. In a bobbin, a base structure comprising a flat plate having an axial opening, a reinforcing plate having its outer section rigidly secured to said flat plate, the middle section of said reinforcing plate being deflected to be spaced a considerable distance away from said flat plate and having an axial opening, a metal tube seating in said openings and having a slot in its end, and a tooth extending from said reinforcing plate into said slot, the tube end being deflected radially outwardly against the outer face of said reinforcing plate.

6. In a bobbin, a base structure comprising a flat plate having an axial opening, a reinforcing plate having its outer section rigidly secured to said flat plate, the middle section of said reinforcing plate being deflected to be spaced a considerable distance away from said flat plate and having an axial opening, a metal tube seating in said openings and having a slot in its end, and a tooth extending from one of said plates into said slot, the tube end being deflected radially outwardly against the outer face of said toothed plate.

In witness whereof, I hereunto subscribe my name this 23 day of April, 1929.

ANTHONY HLAVAC.